United States Patent
Pau et al.

(10) Patent No.: US 11,274,915 B2
(45) Date of Patent: Mar. 15, 2022

(54) INTERFEROMETER WITH MULTIPLE WAVELENGTH SOURCES OF DIFFERENT COHERENCE LENGTHS

(71) Applicant: Arizona Board of Regents on Behalf of the University of Arizona, Tucson, AZ (US)

(72) Inventors: Stanley Pau, Tucson, AZ (US); Rongguang Liang, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 17/052,448

(22) PCT Filed: Apr. 29, 2019

(86) PCT No.: PCT/US2019/029623
§ 371 (c)(1),
(2) Date: Nov. 2, 2020

(87) PCT Pub. No.: WO2019/212959
PCT Pub. Date: Nov. 7, 2019

(65) Prior Publication Data
US 2021/0088321 A1     Mar. 25, 2021

Related U.S. Application Data

(60) Provisional application No. 62/666,299, filed on May 3, 2018.

(51) Int. Cl.
*G01B 9/02*     (2006.01)
*G01B 11/24*    (2006.01)
(Continued)

(52) U.S. Cl.
CPC ..... *G01B 9/02041* (2013.01); *G01B 9/02007* (2013.01); *G01B 11/24* (2013.01); *G01B 11/30* (2013.01); *G02B 5/201* (2013.01)

(58) Field of Classification Search
CPC .. G01B 9/02041; G01B 9/02007; G01B 9/00; G01B 9/02; G01B 9/02008;
(Continued)

(56) References Cited

U.S. PATENT DOCUMENTS 7,230,717 B2   6/2007   Brock et al.
7,948,636 B2   5/2011   De Groot et al.
(Continued)

FOREIGN PATENT DOCUMENTS

DE    102010037207 B3    11/2011

OTHER PUBLICATIONS

Millerd, J., et al., "Pixelated Phase-Mask Dynamic Interferometer," Proc. SPIE, vol. 5531, p. 304-314, 2004.
(Continued)

*Primary Examiner* — Jonathan M Hansen
(74) *Attorney, Agent, or Firm* — Perkins Coie LLP

(57) ABSTRACT

Methods, devices and systems are described that use a combination multiple light sources having different coherence lengths to measure surface characteristics of an object. One example system includes a two laser sources configured to operate at a first and a second center wavelength, a broadband source configured to operate at a range of wavelengths outside of the operating range of the at least two lasers, a phase mask array and a color filter arranged, respectively, to impart different phase delays and provide spectral filtering corresponding to the emitted radiation from the sources. A pixelated sensor device is positioned to simultaneously measure intensity values associated with a plurality of interferograms formed due to interference of (Continued)

light from the light sources after propagation through the phase mask array and the color filter. The measured intensity values enable the determination of surface characteristics of the object.

27 Claims, 6 Drawing Sheets

(51) Int. Cl.
    *G01B 11/30*     (2006.01)
    *G01B 9/02001*     (2022.01)
    *G02B 5/20*     (2006.01)

(58) Field of Classification Search
    CPC .... G01B 9/02009; G01B 11/24; G01B 11/30; G02B 5/201
    See application file for complete search history.

(56) References Cited

U.S. PATENT DOCUMENTS

| | | | |
|---|---|---|---|
| 8,416,399 B2 | 4/2013 | Straehle et al. | |
| 2014/0268168 A1* | 9/2014 | Feldman | G02B 21/0076 356/479 |
| 2016/0123720 A1* | 5/2016 | Thorpe | G01B 9/02004 356/498 |

OTHER PUBLICATIONS

Upputuri, P. K., et al., "Multi-colour microscopic interferometry for optical metro logy and imaging applications," Optics and Lasers in Engineering 84 (2016) 10-25.

Guo, T., et al., "Multi-wavelength phase-shifting interferometry for microstructures measurement based on color image processing in white light interference," Optics and Lasers in Engineering 82 (2016) 41-47.

Fu, Xingzhou, et al., "Optimized design of N optical filters for color and polarization imaging," Optics Express 3011, vol. 24, No. 3, 2016.

Tu, Xingzhou, et al., "Division of amplitude RGB full-Stokes camera using micro-polarizer arrays," Optics Express vol. 25, No. 26, pp. 33160-33175, 2017.

Groot, Peter de, "Principles of interference microscopy for the measurement of surface topography," Adv. Opt. Photon. 7, 1-65 (2015).

Schmit, J., et al., "Surface profilers, multiple wavelength, and white light interferometry." Optical Shop Testing, Third Edition, pp. 674-763, 2007.

International Search Report and Written Opinion dated Jul. 16, 2019 for International Patent Application No. PCT/US2019/029623 (11 pages).

* cited by examiner

INTERFEROMETER WITH MULTIPLE WAVELENGTH SOURCES OF DIFFERENT COHERENCE LENGTHS

CROSS REFERENCE TO RELATED APPLICATIONS

This patent document is a 371 National Phase Application of International Patent Application No. PCT/US2019/029623, filed Apr. 29, 2019, which claims priority to the provisional application with Ser. No. 62/666,299, titled "Snapshot Interferometer with Multiple Wavelength Sources of Different Coherence Lengths," filed May 3, 2018. The entire contents of the above noted applications are incorporated by reference as part of the disclosure of this document.

STATEMENT REGARDING FEDERALLY SPONSORED RESEARCH

This invention was made with government support under Grant No. DBI1455630, awarded by NSF. The government has certain rights in the invention.

TECHNICAL FIELD

The disclosed embodiments relate to interferometers and in particular to interferometry techniques used for measuring surface characteristics.

BACKGROUND

Determination of surface characteristics of an object, such as reflectivity of different wavelengths or measurements of the object's surface profile and roughness, quantify the deviations of the surface from its ideal form. These surface characteristics play an important role on how the object interacts with its environment. In mechanical devices, for example, the surface roughness is related to the coefficient of friction and can determine the wear and tear of the mechanical component. In optical systems, the surface profile and roughness of a component can affect the quality of images that are formed by the system, or determine the accuracy of the measurements that may be conducted by the optical system.

Measurements of surface characteristics can be performed using non-contact techniques that rely on lasers, or more generally light sources, to determine surface characteristics of an object based on the light that is reflected from the object. Many of the existing techniques, however, operate based on the assumption that the object is smooth and highly reflective; these techniques thus fail to properly operate in conjunction with rough surfaces. The existing techniques further suffer from having a limited dynamic range, and often involve expensive equipment having several moving components.

SUMMARY

The disclosed embodiments relate to methods, devices and systems that use a combination multiple light sources having different coherence lengths to measure surface characteristics of an object, such as the surface profile and surface roughness of the object, in a single shot. In some embodiments, the multiple light sources can include one or more lasers, which are generally considered coherent light sources, and one or more incoherent light sources, such as an LED. The disclosed technology, among other features and benefits, provides a non-contact measurement capability, and allows the measurements to be conducted with high speed and high sensitivity, while producing measurement results with high precision and resolution. The disclosed technology finds numerous applications including, but not limited to, metrology, biomedical tissue analysis, molecular imaging and general microscopy. For example, the disclosed devices and methodology can be implemented as part of a metrology tool to inspect medium- to large-size objects or can be part of a microscope to inspect small objects.

One aspect of the disclosed embodiments relates to optical interferometer for measuring surface characteristics of an object that includes at least two laser sources configured to operate at a first and a second center wavelength, respectively, a broadband source configured to operate at a range of wavelengths outside of the operating range of the at least two lasers, and a phase mask array and a color filter arranged, respectively, to impart at least three different phase delays and provide spectral filtering corresponding to the emitted radiation from the at least two laser sources and the broadband source. The optical interferometer also includes a pixelated sensor device to simultaneously measure intensity values associated with a plurality of interferograms formed due to interference of light from the at least two laser sources and due to interference of light from the broadband source after propagation through the phase mask array and the color filter. The measured intensity values associated with the broadband source enable a determination of the roughness, and the measured intensity values associated with the at least two laser sources enable a determination of the surface topography.

BRIEF DESCRIPTION OF THE DRAWINGS

FIG. 2($b$) illustrates an example of a set of four optical filters A, B, C, and D, which can be repeated across a sensor array.

FIG. 4($b$) illustrates a top view of an array of four adjacent pixels, with four color filters that transmit light of different wavelengths in accordance with an exemplary embodiment.

FIG. 4($c$) illustrates an array of sixteen pixels, with four different phase masks in accordance with an exemplary embodiment.

DETAILED DESCRIPTION

In this document, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

In the sections that follow, references are made to a Twyman-Green interferometer to provide an example for facilitating the understanding of the underlying concepts. It should be noted, however, that the disclosed technology can be implemented in different configurations using other types of interferometers that includes a test arm and a reference arm.

Figure 1:
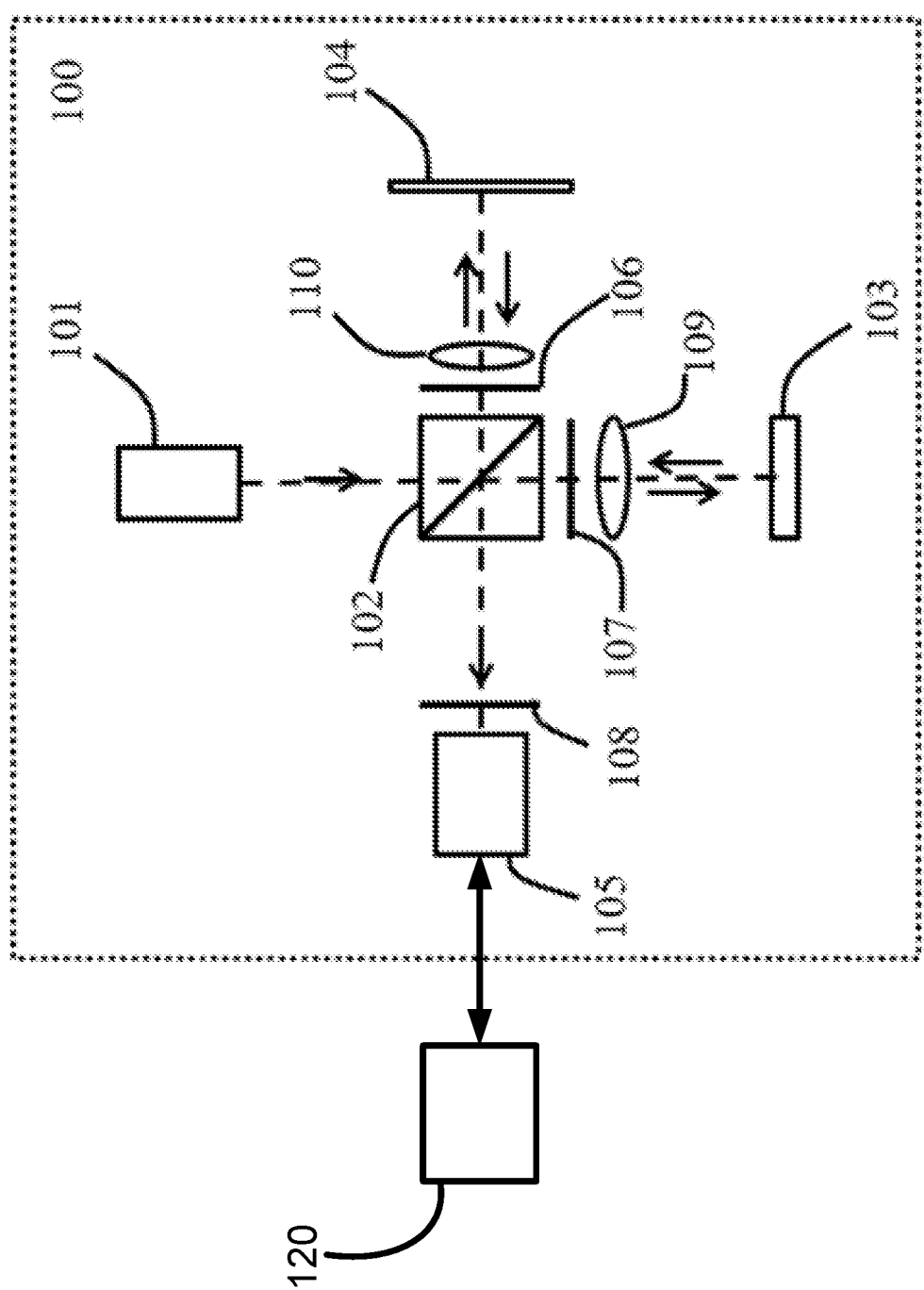
FIG. 1 illustrates a pixelated phase-mask Twyman-Green interferometer.

FIG. 1 shows a conventional pixelated phase-mask Twyman-Green interferometer 100. A monochromatic light source 101 has an output that is directed toward a polarization beam splitter 102, which divides the light into two parts. One part is reflected from an object or a sample of interest 104 (sometimes referred to as the test arm) and another part is reflected from the reference optics 103 (sometimes referred to as the reference arm). The light passes through quarter waveplates 106 and 107 and is recombined by the beam splitter 102, creating fringe patterns that are incident on the pixelated phase mask 108 and onto an array sensor 105. The intensity at the sensor, with a coordinate system denoted by x and y, is given by:

$$I(x,y)=\tfrac{1}{2}[I_{ref}+I_{samp}+2\sqrt{I_{ref}I_{samp}}\cos(\Delta\phi(x,y)+2\alpha)] \quad (1).$$

In Equation (1), $I_{ref}$, $I_{samp}$, $\Delta\phi$, $\alpha$ are the light received from the reference sample 103, light received from the sample 104, phase delay between the light in the test arm and reference arm, and phase introduced by the phase mask 108, respectively. The array sensor 105 measures the four phase-shifted interferograms simultaneously. The phase delay $\Delta\phi(x,y)$ is related to the depth of the sample $d(x,y)$ by:

$$\Delta\phi(x, y) = \frac{2\pi d(x, y)}{\lambda}, \text{ or} \quad (2a)$$

$$d(x, y) = \frac{\lambda \Delta\phi(x, y)}{2\pi}. \quad (2b)$$

These and other computations can be carried out by a processor 120, such as a microprocessor, a controller, or generally a computer. The processor 120 includes a memory having instructions or program code stored thereupon that can be executed by the processor 120 to carry out the computations. In some implementations, the processor 120 can further control additional operations of the interferometer, such as controlling the operation of the light source 101, or triggering the movement of lenses or other components, if needed. The processor 120 in some implementations is incorporated into the interferometer 100, while in other implementations can be a separate component that is in communication with the interferometer 100 via a wired or wireless connection.

Figures 2A, 2B:
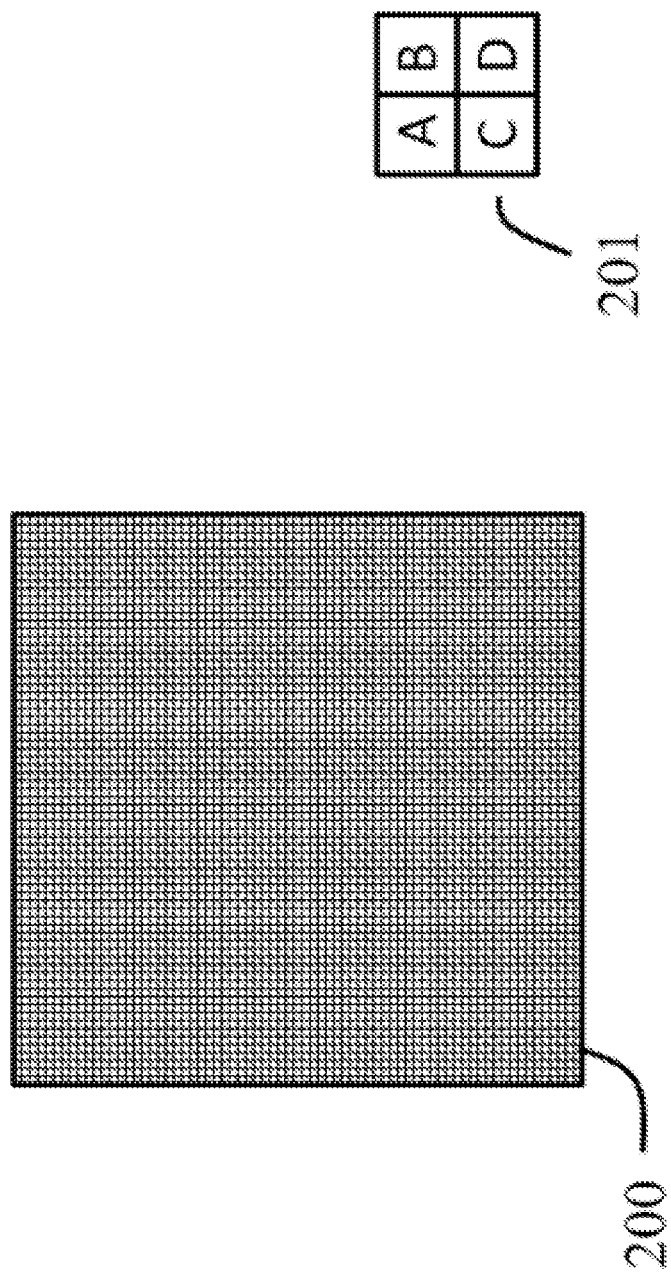
FIG. 2($a$) illustrates an example of the phase mask that can be used in the configuration of FIG. 1.

The phase mask 108 can be an array of birefringent plate. In a common implementation, it is an array of micropolarizers, and the dimensions of each polarizer are identical to the dimensions of a pixel in the array sensor 105. Lenses 109 and 110 can also be used to change the magnification of the light beam in the two arms of the interferometer. FIG. 2(a) shows an example of the phase mask 200, and FIG. 2(b) shows an example of a set of four unique optical filters A, B, C, and D, denoted as 201, which are repeated across the entire sensor. The combination of filters introduces a unique phase shift on the light incident on each filter set. In a typical configuration, where the phase shifts are 0, $\pi/2$, $\pi$, and $3\pi/2$, the four intensity interferograms at the array sensor 105 can be represented by:

$$A(x,y)=\tfrac{1}{2}[I_{ref}+I_{samp}+2\sqrt{I_{ref}I_{samp}}\cos(\Delta\phi(x,y))] \quad (3),$$

$$B(x,y)=\tfrac{1}{2}[I_{ref}+I_{samp}+2\sqrt{I_{ref}I_{samp}}\cos(\Delta\phi(x,y)+\pi/2)] \quad (4),$$

$$C(x,y)=\tfrac{1}{2}[I_{ref}+I_{samp}+2\sqrt{I_{ref}I_{samp}}\cos(\Delta\phi(x,y)+\pi)] \quad (5),$$

$$D(x,y)=\tfrac{1}{2}[I_{ref}+I_{samp}+2\sqrt{I_{ref}I_{samp}}\cos(\Delta\phi(x,y)+3\pi/2)] \quad (6).$$

Measurement of the intensities A, B, C and D allows the calculation of the phase using the following relationship:

$$\Delta\phi(x, y) = \operatorname{atan}\left[\frac{C(x, y) - A(x, y)}{D(x, y) - B(x, y)}\right]. \quad (7)$$

The computed phase can then be used in conjunction with Equation (2b) to compute the depth, $d(x,y)$, of the sample of interest. It should be noted that in the above description, the particular phase values 0, $\pi/2$, $\pi$, and $3\pi/2$ are provided to facilitate the understanding of the measurement technique. In the disclosed embodiments of this patent document, other phase values may be used, and/or fewer or additional phase shifts may be implemented. For example, a minimum of three phase shifts, such as 0, $2\pi/3$ and $4\pi/3$, may be introduced in some embodiments.

The existing techniques that use the above phase-shifting arrangement operate under the assumption that the surface of the sample 104 is smooth and has good reflectivity. For samples with a rough surface, the light is scattered locally, and the interference between the reference beam and test bean results in a fringe pattern with low or no visibility. In addition, the dynamic range of the interferometer 100 is determined by the coherence length and the wavelength of the light source. For a monochromatic source of wavelength $\lambda_1$, measurements of up to only a depth of $\lambda_1/4$ can be performed without ambiguity in phase. Therefore, some disadvantages of using a monochromatic source include a limited dynamic range due to phase ambiguity and the difficulty in measuring rough surfaces.

In order to increase the measurement's dynamic range, multiple light sources with different wavelengths can be combined together with an effective wavelength that is much longer than a single wavelength. For sources having two monochromatic wavelengths, $\lambda_1$ and $\lambda_2$, the effective wavelength is given by:

$$\Lambda_{12} = \frac{\lambda_1 \lambda_2}{\lambda_1 - \lambda_2}. \quad (8)$$

In scenarios where the denominator of Equation (8) is large, substituting $\Lambda_{12}$ into Equation (2b), produces a depth, $d(x,y)$, value that is approximately equal to $\Lambda_{12}$. It should be noted that the effective wavelength, $\Lambda_{effective}$, when more than two monochromatic sources are used can be computed via multiple iterations of Equation (8). For example, when a third monochromatic source with wavelength $\lambda_3$ is also present, $\lambda_3$ and the computed $\Lambda_{12}$ are used in a second iteration of Equation (8) to compute a new effective wavelength. This arrangement, however, is not effective for measuring rough surfaces, as noted earlier.

In some configurations, white-light interferometry can be used to measure the profile of a rough surface. For example, the monochromatic source 101 in FIG. 1 can be replaced by a broadband light source, such as the output of a light emitting diode or a white light source passing through a bandpass filter. By the nature of the broadband light, the dynamic range of the white-light interferometer is rather limited, because the maximum optical path difference that can be measured using an interferometer depends on the coherence length of the optical source, which is inversely proportional to the spectral linewidth of the source. In particular, the coherence length, $L_c$, of a quasi-monochromatic light source described by a Lorentzian optical spectrum is given by:

$$L_c = \frac{c}{n\pi\Delta F} = \frac{\lambda^2}{n\pi\Delta\lambda}. \tag{9}$$

In Equation (9), c, n, $\lambda$, $\Delta\lambda$ and $\Delta f$ are the speed of light in vacuum, the refractive index of the medium in which the light travels, the wavelength of the source, the linewidth in wavelength of the source and the linewidth in frequency of the source, respectively. The coherence length determines the propagation distance beyond which fringe formation caused by interference is significantly reduced and generally puts a limit on the dynamic range of the operation of an interferometer. The linewidth of a conventional single mode He—Ne laser at wavelength of 632.8 nm can be 1 GHz, corresponding to a coherence length of about 95.4 mm. For a diode pumped solid state laser (DPSS) operating at 531.65 nm, the coherence length can be greater than 10 m. For a GaAlAs/GaAs light emitting diode (LED) operating at 650 nm, the coherence length can be around 10 microns.

The interferogram for low coherence light source can be described as:

$$I_n(x, y) = I'\left[1 + \gamma(z)\cos\left(k_0 z(x, y) + N\left(\frac{\pi}{2}\right)\right)\right]. \tag{10}$$

In Equation (10), I' is the background intensity, $\gamma(z)$ is the fringe visibility function or coherence envelope and is proportional to the modulus of the Fourier transform of the source spectrum, $k_0=2\pi/\lambda_0$ is the central wave number for fringes under the envelope, and N is an integer, denoting the different phase-shifted measurement. With four phase-shifted interferograms, we can use Equation (7) to calculate the phase for each point and estimate the local surface structure based on Equation (2b). The surface roughness can then be calculated from the surface structure. The systems that use such wideband sources, while enabling the resolution of smaller-scale surface variations, suffer from having a limited dynamic range. Thus, there is a need for systems and methods that can detect surface roughness of a sample, as well as measuring the depths and contours of the sample at a high dynamic range.

The disclosed embodiments, among other features and benefits address the above described problems, and utilize monochromatic and white light interferometry to enable both measurements at high accuracy levels using only a single shot (e.g., a single image or frame of a fringe pattern). The disclosed embodiments further eliminate the need for moving parts, provide a flexible solution that can designed to accommodate different applications, with different range and surface roughness measurement requirements. It should be noted that roughness can have a different spatial frequency from the surface topography (or sometimes referred to as "range") which include larger-scale variations of a surface. In some examples, surface roughness that includes small amplitude changes over short distance is measured over a flat area. For example, surface roughness for different unpolished materials can be around 0.01 to 10 microns, while the topography can vary from 1 to 100 microns, or more. Thus, in some instances, there can be an overlap between variations that are characterized as surface roughness and surface topography. The disclosed embodiments enable the measurement of both types of surface variations, i.e., surface roughness and topography at least in-part by deploying multiple light sources having differing coherence lengths that are configured for use in the same interferometer.

Figure 3:
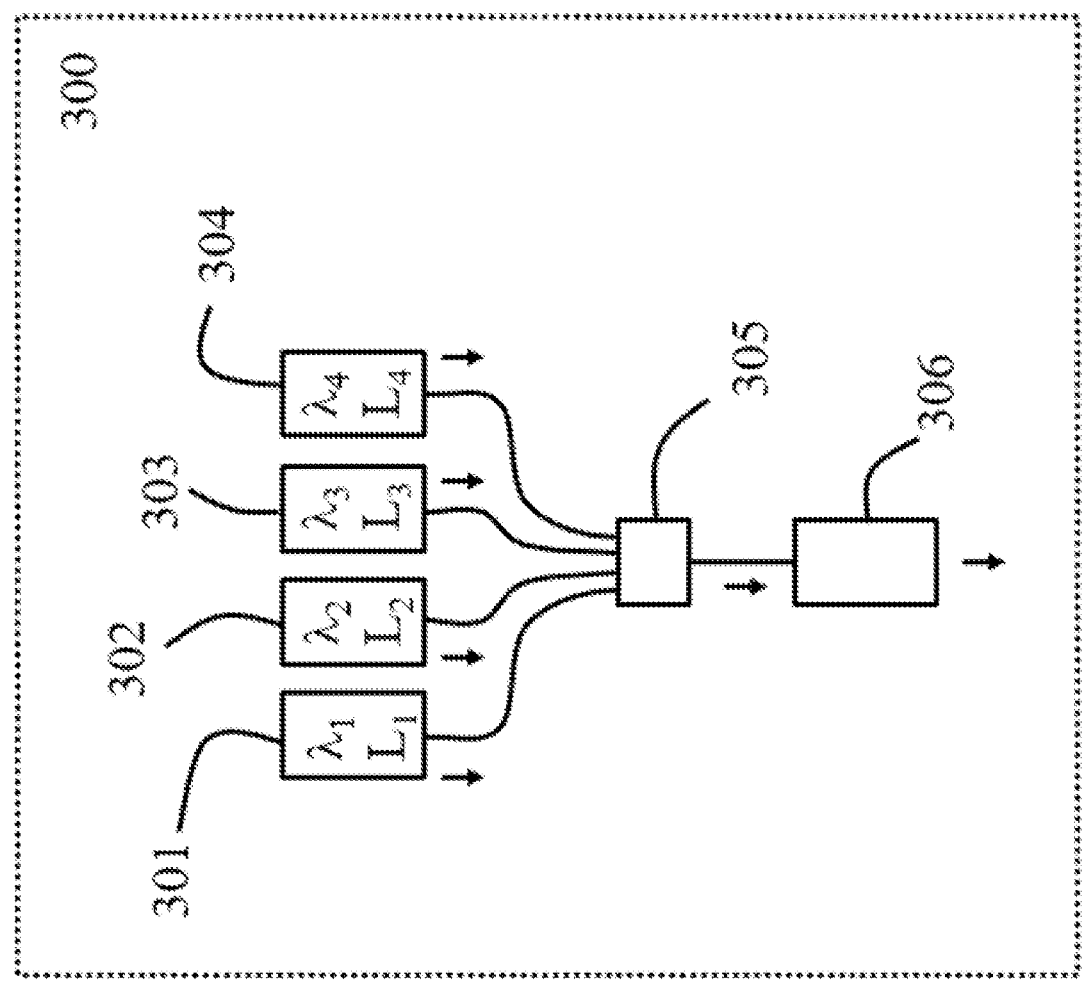
FIG. 3 illustrates an illumination source that utilizes multiple illumination sources in accordance with an exemplary embodiment.

FIG. 3 illustrates an illumination source 300 that utilizes a combination of multiple illumination sources in accordance with an exemplary embodiment. The system 300 can be used in an interferometer to measure both the profile and surface roughness of an object in a single shot. FIG. 3 shows the illumination source 300 which includes four independent sources: (1) source 301 with wavelength $\lambda_1$ and coherence length $L_1$, (2) source 302 with wavelength $\lambda_2$ and coherence length $L_2$, (3) source 303 with wavelength $\lambda_3$ and coherence length $L_3$, and (4) source 304 with wavelength $\lambda_4$ and coherence length $L_4$. A combiner 305 is utilized to combine the outputs of the four sources. For example, the combiner can be a multi-faceted beam splitter operating in reverse to combine the input beams. Optical fibers can be used to connect the sources to the combiner. The output of the combiner may go through a set of optical filters 306 to further improve the polarization, coherence and wavelength properties of the illumination. In some implementations, instead of four independent sources, a single source can be used, which is then spectrally filtered to produce the different light sources.

Figure 4:
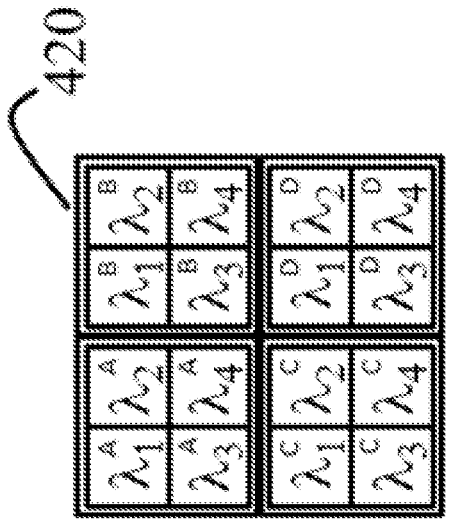
FIG. 4($a$) illustrates a side view of a multi-layer pixel sensor including of an array of pixels, an array of color filters and an array of phase masks in accordance with an exemplary embodiment.
Figure 4:
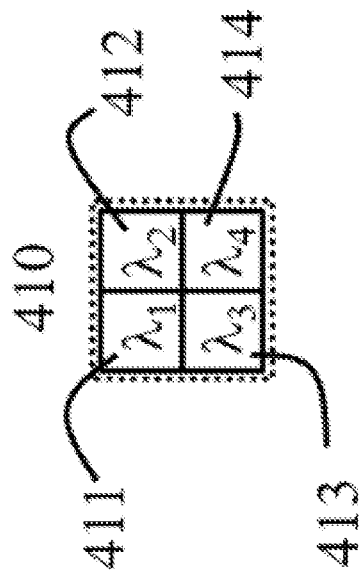
Figure 4:
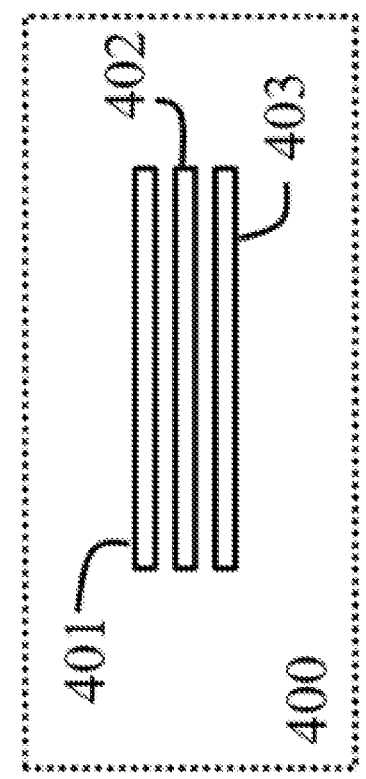

An array of pixelated phase mask and color filters along with an array of pixel sensors can be designed to measure the interferograms generated by the four sources. One example of this type of multi-layer pixel sensor is shown in FIG. 4(a), which illustrates a side view of a detector 400 including of an array of pixels 403, with an array of color filters 402 and an array of phase masks 401 on top. The gap between the filters, phase mask and pixels should be made small to reduce crosstalk between pixels. In practice, the filter and phase mask can be fabricated directly on top of the sensor. Alternatively, the phase mask can be fabricated on a separate substrate and subsequently aligned and attached on top of the sensor with built-in color filters. The sensor can be selected from a variety of different sensor devices including, but not limited to, a CMOS sensor, a charge coupled device (CCD), an infrared (IR) sensor, an InGaAs detector, or other types of detector arrays.

FIG. 4(b) shows the top view of an array of four adjacent pixels 410, with four color filters that transmit light of wavelengths, $\lambda_1$, $\lambda_2$, $\lambda_3$, and $\lambda_4$. FIG. 4(c) shows an array of sixteen pixels 420, with four different phase masks, A, B, C and D, resembling those in FIG. 2(b). In the example of FIG. 4(c), the linear dimensions of the phase mask pixel are twice the linear dimensions of the wavelength pixels. Each type of phase mask has four pixels that are sensitive to four different wavelengths. In this arrangement, four interferograms can be measured simultaneously at four different wavelengths at the same time.

The illumination source 300 and the detector 400 can be used in a Twyman-Green interferometer, such as the one shown in FIG. 1. It should be noted that in some implementations at least part of the detector can be produced as a separate component from the interferometer that is subsequently incorporated into, and used in conjunction with, the interferometer to enable the disclosed measurements. In some embodiments, the arrangement order of the arrays can be changed; for example, in FIG. 4(a), the locations of the phase mask array and the color filter array can be swapped. In one embodiment, each of the sources emitting wavelengths 1, 2 and 3, respectively, are lasers with different wavelengths and long coherence lengths, and the source emitting wavelength 4 is an LED having a short coherence length and emitting in a wavelength range that is different from sources 1, 2 and 3. The application of three lasers increases the dynamic range of the depth measurements, while the application of the LED permits the measurement of a rough surface and its surface roughness, all from a single captured image on the sensor.

It should be noted that while the above description refers to sources having a particular wavelength, it is understood that each source may have a finite spectral spread and occupy a range of wavelengths. For example, $\lambda_1$, $\lambda_2$, $\lambda_3$, and $\lambda_4$ associated with each of the sources and filters in FIGS. 3, 4(a) and 4(b) can denote the center wavelength for the corresponding source and transmission band of the filter. As discussed in connection with Equation (9), the coherence length of the source is inversely proportional to the spectral linewidth of the source, which allows the spectral contents of the broadband source (e.g., an LED) to be shaped or selected to provide a desired coherence length, which in turn allows the surface roughness of the sample to be measured with high accuracy using a relatively inexpensive light source. The accuracy is generally a function of the wavelengths and coherence length(s) and can range from 0.1 nm to 10 nm. At the same, as evident from Equation (8), the dynamic range for allowing larger-scale topography measurements can be designed and tuned by selecting the proper spectral separation between the sources having long coherent lengths (e.g., lasers) to meet the requirements of a particular application. Thus, the disclosed multi-source measurement methods and devices provide flexible and versatile solutions that can be implemented in different applications, from microscopy to metrology to others, enabling topography and roughness measurements of objects with different sizes and different profiles. Moreover, as noted earlier, the measurement results can be obtained all at the same time (e.g., as a single shot) due to the arrangement of color and phase mask arrays on the pixelated sensor, thereby enabling high-speed and high-accuracy measurements. The disclosed systems can utilize as few as two sources with long coherence lengths and a single source having a short coherence length.

Figure 5:
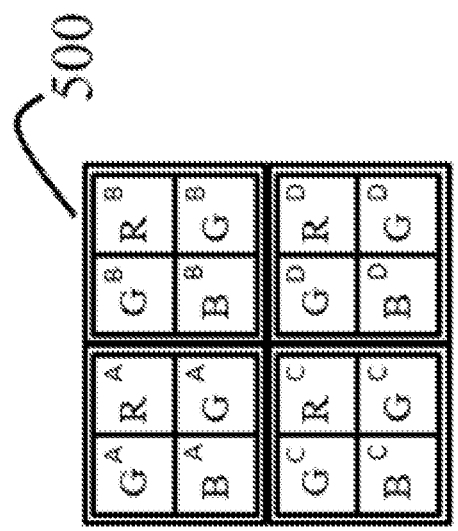
FIG. 5 illustrates an arrangement of a detector array that includes red, green and blue filters in a Bayer pattern.

The disclosed technology can also be adapted to operate using certain commonly available detector arrays. For example, FIG. 5 shows the arrangement of a detector array that includes red, green and blue filters in a conventional Bayer pattern. This detector can be purchased from various vendors such as 4D Technology Corporation (Tucson, Ariz.). Utilizing this detector in a configuration shown in FIG. 1, the three sources with long coherence lengths can be selected to be red, green and blue lasers, and the source with a low coherence length can be a red LED. The lasers are turned on first, and the interferograms of the RGB channels are measured. Subsequently, the lasers are turned off and the LED is turned on. The interferograms of the red LED are measured. Due to the specific spectral characteristics of the Bayer filter (i.e., having two green filters), the measurements are not carried out in a single shot, but both the depth and roughness can be measured in two sequential measurements.

In another variation, three sources can be used: a green and a blue laser and a red LED, which allows the interferograms of the red, green and blue lights to be measured in a single shot.

As noted earlier, the number of sources, the emission wavelengths of the sources, and spectral separation of the sources with long coherence lengths can be varied to achieve certain dynamic range and accuracy characteristics. In addition, the number of color filters and phase masks in the detector can be varied to accommodate the source for a single shot or multiple shot configurations.

Figure 6:
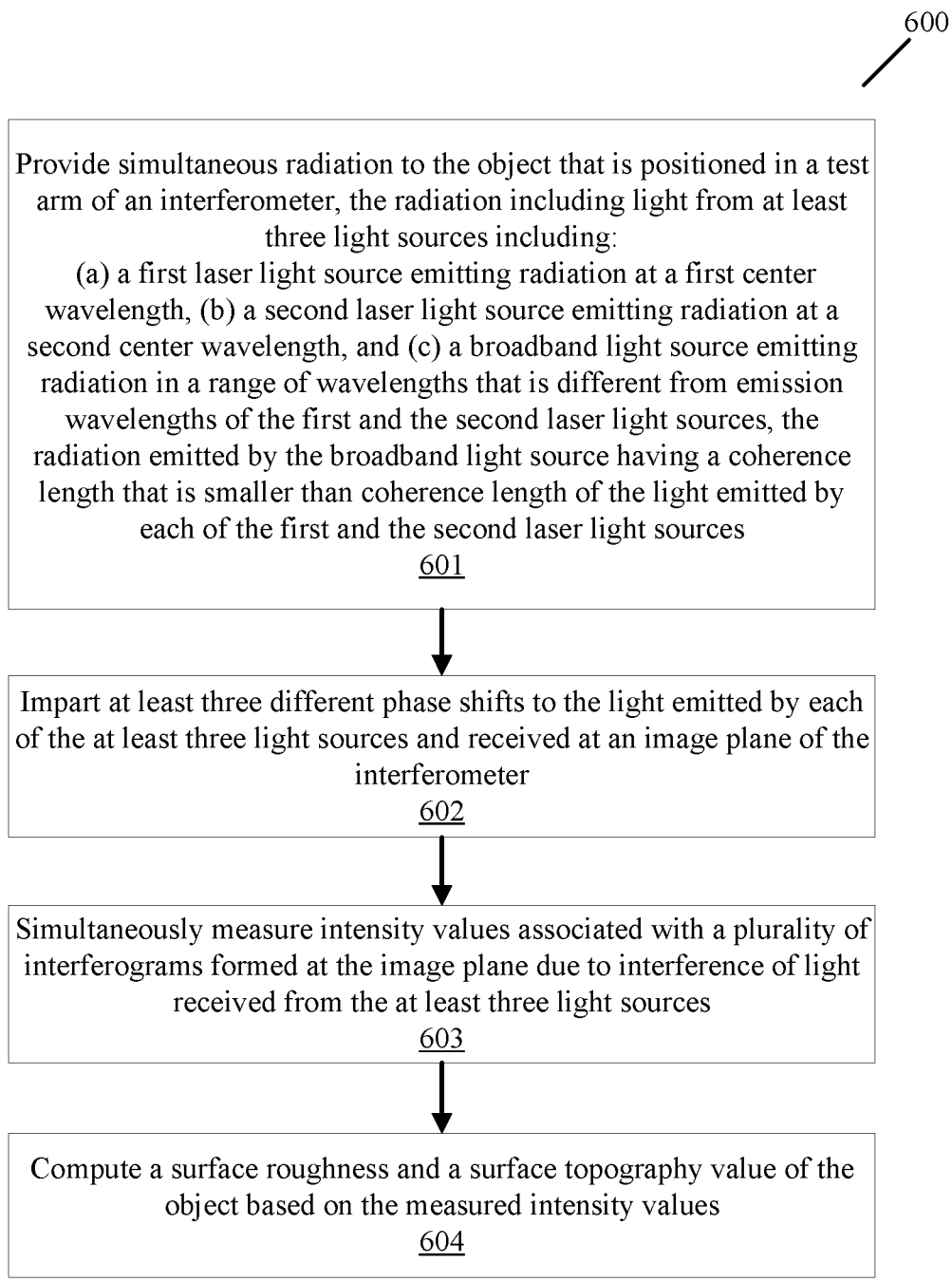
FIG. 6 illustrates a set of operations that can be carried out to surface characteristics of an object in a single shot in accordance with an exemplary embodiment.

FIG. 6 illustrates a set of operations 600 that can be carried out to measure depth and roughness of an object in a single shot in accordance with an exemplary embodiment. The operations at 601 includes providing simultaneous radiation to the object that is positioned in a test arm of an interferometer. The radiation includes light from at least three light sources including (a) a first laser light source emitting radiation at a first center wavelength, (b) a second laser light source emitting radiation at a second center wavelength, and (c) a broadband light source emitting radiation in a range of wavelengths that is different from emission wavelengths of the first and the second laser light sources, the radiation emitted by the broadband light source having a coherence length that is smaller than coherence length of the light emitted by each the first and the second laser light sources. At 602, at least three different phase shifts are imparted to the light emitted by each of the at least three light sources and received at an image plane of the interferometer. The operations at 603 includes simultaneously measuring intensity values associated with a plurality of interferograms formed at the image plane due to interference of light received from the at least three light sources. At 604, a surface roughness value and a topography value of the object are computed based on the measure intensity values.

In some embodiments, measuring the intensity values includes using a pixelated detector including a color filter array to obtain intensity values in each of the spectral ranges of the at least three light sources and having each of the at least three different phase shifts. In another example embodiment, the depth value is computed based on a product of a phase value obtained from intensity measurements of the plurality of interferograms, and an effective wavelength that is obtained based on at least the first center wavelength and the second center wavelength. In yet another example embodiment, the surface roughness value is computed using intensity values obtained based on intensity measurements associated with interferograms produced by the radiation from the broadband source. In still another example embodiment, the coherence lengths of the radiation emitted by the first and the second laser light sources are at least one order of magnitude larger than the coherence length of the radiation emitted by the broadband light source. In another example embodiment, the radiation includes light from a third laser emitting radiation at a third center wavelength that is different from the first and the second center wavelengths and is outside of the range of wavelengths emitted by the broadband source.

Another aspect of the disclosed embodiments relates to a system for measuring surface characteristics of an object that includes at least three light sources including (a) a first laser light source operable to emit radiation at a first center wavelength, (b) a second laser light source operable to emit radiation at a second center wavelength, and (c) a broadband light source operable to emit radiation in a range of wavelengths that is different from emission wavelengths of the first and the second laser light sources. The radiation emitted by the broadband light source has a coherence length that is smaller than coherence lengths of each of the light emitted by the first and the second laser light sources. The system also includes an interferometer that includes a test arm and a reference arm arranged to allow light from each of the at least three light sources to propagate through at least a section of the test arm, reflect from the object and reach an image plane, and light from each of the at least three light sources to propagate through at least a section of the reference arm, reflect from a reference optical component and reach the image plane. In this system, the light that reaches the image plane forms a plurality of interferograms at the image plane, where a single measurement of intensity values associated with the plurality of the interferograms enables a measurement of both a surface topography value and a surface roughness value associated with the object.

In one example embodiment, the system further includes a detector positioned at the image plane that includes (a) a sensor device that includes a plurality of pixels, (b) a color filter array that includes a plurality of elements, where each element of the color filter array includes a plurality of sub-elements, and each sub-element allows only a particular band of wavelengths to pass therethrough, and (c) a phase mask array that includes a plurality of elements. Each element of the phase mask array includes a plurality of sub-elements that each impart a particular phase delay to light that passes therethrough. The single measurement of the intensity values includes measured intensity values of spectrally filtered and phase shifted light that reaches the plurality of pixels of the sensor device.

In another exemplary embodiment, the system further includes a processor and a memory including instructions stored thereupon. The processor is coupled to the detector to receive and process electrical signals corresponding to the intensity values of the one or more interferograms. The instructions upon execution by the processor cause the processor to compute both the surface topography value and the surface roughness value associated with the object based upon the single measurement of intensity values associated with the plurality of the interferograms obtained from the sensor device. In one example embodiment, the color filter and the phase mask array are arranged to allow light at the image plane to traverse through the phase mask array onto the color filter before reaching the sensor device. In another example embodiment, the color filter and the phase mask array are arranged to allow light at the image plane to traverse through the color filter onto the phase mask array before reaching the sensor device.

According to one example embodiment, the phase mask array includes an array of micropolarizers which introduces interference between different polarization states. In another example embodiment, the sub-elements of the phase mask array are configured to impart at least three different delays to the light that passes therethrough. In yet another example embodiment, the sub-elements of the phase mask array are configured to impart four different delays to the light that passes therethrough. In still another example embodiment, each element of the color filter array is configured to allow transmission of light therethrough having spectral characteristics that match one of the at least three light sources.

In yet another example embodiment, a first sub-element of the color filter allows transmission of light therethrough having the first center wavelength, a second sub-element of the color filter allows transmission of light therethrough having the second center wavelength, and a third sub-element of the color filter allows transmission of light therethrough in the range of wavelengths emitted by the broadband light source.

In one example embodiment, the sensor device, the color filter array and the phase mask array are configured to allow: a first pixel of the sensor device to receive light having the first center wavelength and a first phase delay value; a second pixel of the sensor device to receive light having the first center wavelength and a second phase delay value; a third pixel of the sensor device to receive light having the first center wavelength and a third phase delay value; a fourth pixel of the sensor device to receive light having the second center wavelength and the first phase delay value; a fifth pixel of the sensor device to receive light having the second center wavelength and the second phase delay value; a sixth pixel of the sensor device to receive light having the second center wavelength and the third phase delay value; a seventh pixel of the sensor device to receive light in the range of wavelengths emitted by the broadband light source and having the first phase delay value; an eighth pixel of the sensor device to receive light in the range of wavelengths emitted by the broadband light source and having the second phase delay value; and a ninth pixel of the sensor device to receive light in the range of wavelengths emitted by the broadband light source and having the third phase delay value.

In another example embodiment, the system includes a third laser source operable to emit radiation at a third center wavelength that is different from the first and the second center wavelengths, and is outside of the range of wavelengths emitted by the broadband light source.

In one example embodiment, the coherence lengths of the light emitted by the first and the second laser light sources are at least one order of magnitude larger than the coherence length of the broadband light source. In another example embodiment, two or more of the at least three light sources are part of a single light source, and the system further includes spectral filters or a beam splitter positioned to receive and split the light from the single light source into two or more spectrally distinct output beams.

According to one example embodiment, the surface topography value is computed using intensity values obtained based on interferograms produced by at least the first and the second laser sources but not the broadband source. In another example embodiment, the surface topography value is computed based on a product of a phase value obtained from intensity measurements of the plurality of interferograms, and an effective wavelength that is obtained based on at least the first center wavelength and the second center wavelength. In yet another example embodiment, the surface roughness value is computed using intensity values obtained based on intensity measurements associated with interferograms produced by the broadband source.

In another example embodiment, the system includes a third laser source that is operable to emit radiation at a third center wavelength that is different from the first and the second center wavelengths, and is outside of the range of wavelengths emitted by the broadband light source. In this example embodiment, the phase mask array is configured to impart a first, a second, a third or a fourth phase delay to the light that is incident thereupon, the color filter array is configured to allow selective transmission of four wavelength bands therethrough, and the color filter array and the phase mask array are arranged to allow each pixel of a sixteen-pixel array of the sensor device to receive light having: one of the first wavelength, or the second wavelength, or the third wavelength or a wavelength in the range of wavelengths emitted by the broadband light source; and one of the first, the second, the third or the fourth phase delay.

In some embodiments, the surface roughness value corresponds to a small-scale surface variation determined based on the coherence length of the broadband source and the surface topography value corresponds to a larger-scale surface variation, as compared to the surface roughness value, that is determined based on at least an inverse relationship between a difference between the first center wavelength and the second center wavelength.

The processing devices that are described in connection with the disclosed embodiments can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Various embodiments described herein are described in the general context of methods or processes, which may at least in-part be implemented by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A system for measuring surface characteristics of an object, comprising:
at least three light sources including:
a first laser light source operable to emit radiation at a first center wavelength,
a second laser light source operable to emit radiation at a second center wavelength, and
a broadband light source operable to emit radiation in a range of wavelengths that is different from emission wavelengths of the first and the second laser light sources, the radiation emitted by the broadband light source having a coherence length that is smaller than coherence lengths of each of the light emitted by the first and the second laser light sources;
an interferometer including:
a test arm and a reference arm arranged to allow light from each of the at least three light sources to propagate through at least a section of the test arm, reflect from the object and reach an image plane, and light from each of the at least three light sources to propagate through at least a section of the reference arm, reflect from a reference optical component and reach the image plane, the light reaching the image plane forming a plurality of interferograms at the image plane, wherein a single measurement of intensity values associated with the plurality of the interferograms enables a measurement of both a surface roughness value and a surface topography value associated with the object.

2. The system of claim 1, further including a detector positioned at the image plane and comprising:
a sensor device including a plurality of pixels;
a color filter array including a plurality of elements, each element of the color filter array including a plurality of sub-elements, each sub-element allowing only a particular band of wavelengths to pass therethrough; and
a phase mask array including a plurality of elements, each element of the phase mask array including a plurality of sub-elements that each impart a particular phase delay to light that passes therethrough, wherein the single measurement includes measured intensity values of spectrally filtered and phase shifted light that reaches the plurality of pixels of the sensor device.

3. The system of claim 2, further comprising a processor and a memory including instructions stored thereon, the processor coupled to the detector to receive and process electrical signals corresponding to the intensity values of the one or more interferograms, wherein the instructions upon execution by the processor cause the processor to compute both the surface topography value and the surface roughness value associated with the object based upon the single measurement of intensity values associated with the plurality of the interferograms obtained from the sensor device.

4. The system of claim 2, wherein the color filter and the phase mask array are arranged to allow light at the image plane to traverse through the phase mask array onto the color filter before reaching the sensor device.

5. The system of claim 2, wherein the color filter and the phase mask array are arranged to allow light at the image plane to traverse through the color filter onto the phase mask array before reaching the sensor device.

6. The system of any of claim 2, wherein the phase mask array includes an array of micropolarizers to introduce interference between different polarization states.

7. The system of any of claim 2, wherein the sub-elements of the phase mask array are configured to impart at least three different delays to the light that passes therethrough.

8. The system of any of claim 7, wherein the sub-elements of the phase mask array are configured to impart four different delays to the light that passes therethrough.

9. The system of any of claim 2, wherein each element of the color filter array is configured to allow transmission of light therethrough having spectral characteristics that match one of the at least three light sources.

10. The system of any of claim 2, wherein a first sub-element of the color filter allows transmission of light therethrough having the first center wavelength, a second sub-element of the color filter allows transmission of light therethrough having the second center wavelength, and a third sub-element of the color filter allows transmission of light therethrough in the range of wavelengths emitted by the broadband light source.

11. The system of any of claim 2, wherein the sensor device, the color filter array and the phase mask array are configured to allow:
a first pixel of the sensor device to receive light having the first center wavelength and a first phase delay value;
a second pixel of the sensor device to receive light having the first center wavelength and a second phase delay value;
a third pixel of the sensor device to receive light having the first center wavelength and a third phase delay value;
a fourth pixel of the sensor device to receive light having the second center wavelength and the first phase delay value;
a fifth pixel of the sensor device to receive light having the second center wavelength and the second phase delay value;
a sixth pixel of the sensor device to receive light having the second center wavelength and the third phase delay value;
a seventh pixel of the sensor device to receive light in the range of wavelengths emitted by the broadband light source and having the first phase delay value;
an eighth pixel of the sensor device to receive light in the range of wavelengths emitted by the broadband light source and having the second phase delay value; and
a ninth pixel of the sensor device to receive light in the range of wavelengths emitted by the broadband light source and having the third phase delay value.

12. The system of claim 1, including a third laser source operable to emit radiation at a third center wavelength that is different from the first and the second center wavelengths, and is outside of the range of wavelengths emitted by the broadband light source.

13. The system of claim 1, wherein the coherence lengths of the light emitted by the first and the second laser light sources are at least one order of magnitude larger than the coherence length of the broadband light source.

14. The system of claim 1, wherein two or more of the at least three light sources are part of a single light source, and wherein the system further includes spectral filters or one or more beam splitters positioned to receive and split the light from the single light source into two or more spectrally distinct output beams.

15. The system of any of claim 1, wherein the surface topography value is computed using intensity values obtained based on interferograms produced by at least the first and the second laser sources but not the broadband source.

16. The system of claim 1, wherein the surface topography value is computed based on a product of a phase value obtained from intensity measurements of the plurality of interferograms, and an effective wavelength that is obtained based on at least the first center wavelength and the second center wavelength.

17. The system of claim 1, wherein the surface roughness value is computed using intensity values obtained based on intensity measurements associated with interferograms produced by the broadband source.

18. The system of claim 2, including a third laser source operable to emit radiation at a third center wavelength that is different from the first and the second center wavelengths, and is outside of the range of wavelengths emitted by the broadband light source, wherein:
the phase mask array is configured to impart a first, a second, a third or a fourth phase delay to the light that is incident thereupon,
the color filter array is configured to allow selective transmission of four wavelength bands therethrough, and
the color filter array and the phase mask array are arranged to allow each pixel of a sixteen-pixel array of the sensor device to receive light having:
one of the first wavelength, or the second wavelength, or the third wavelength or a wavelength in the range of wavelengths emitted by the broadband light source, and
one of the first, the second, the third or the fourth phase delay.

19. The system of claim 1, wherein the surface roughness value corresponds to a small-scale surface variation determined based on the coherence length of the broadband source and the surface topography value corresponds to a larger-scale surface variation, as compared to the surface roughness value, that is determined based on at least an inverse relationship between a difference between the first center wavelength and the second center wavelength.

20. A method for measuring surface characteristics of an object in a single shot, the method comprising:
providing simultaneous radiation to the object that is positioned in a test arm of an interferometer, the radiation including light from at least three light sources including:
a first laser light source emitting radiation at a first center wavelength,
a second laser light source emitting radiation at a second center wavelength, and
a broadband light source emitting radiation in a range of wavelengths that is different from emission wavelengths of the first and the second laser light sources, the radiation emitted by the broadband light source having a coherence length that is smaller than coherence lengths of the light emitted by each of the first and the second laser light sources;
imparting at least three different phase shifts to the light that is emitted by each of the at least three light sources and is received at an image plane of the interferometer;
simultaneously measuring intensity values associated with a plurality of interferograms formed at the image plane due to interference of light received from the at least three light sources; and
computing a surface roughness and a depth value of the object based on the measure intensity values.

21. The method of claim 20, wherein measuring the intensity values includes using a pixelated detector including a color filter array to obtain intensity values in each of the spectral ranges of the at least three light sources and having each of the at least three different phase shifts.

22. The method of claim 20, wherein the depth value is computed based on a product of a phase value obtained from intensity measurements of the plurality of interferograms, and an effective wavelength that is obtained based on at least the first center wavelength and the second center wavelength.

23. The method of any of claim 20, wherein the surface roughness value is computed using intensity values obtained based on intensity measurements associated with interferograms produced by the radiation from the broadband source.

24. The method of any of claim 20, wherein the coherence lengths of the radiation emitted by the first and the second laser light sources are at least one order of magnitude larger than the coherence length of the radiation emitted by the broadband light source.

25. The method of any of claim 20, wherein the radiation includes light from a third laser emitting radiation at a third center wavelength that is different from the first and the second center wavelengths and is outside of the range of wavelengths emitted by the broadband source.

26. An optical interferometer for measuring surface characteristics of an object, comprising:
at least two laser sources configured to operate at a first and a second center wavelength, respectively;
a broadband source configured to operate at a range of wavelengths outside of the operating range of the at least two lasers;
a phase mask array and a color filter arranged, respectively, to impart at least three different phase delays and provide spectral filtering corresponding to the emitted radiation from the at least two laser sources and the broadband source; and
a pixelated sensor device to simultaneously measure intensity values associated with a plurality of interferograms formed due to interference of light from the at least two laser sources and due to interference of light from the broadband source after propagation through the phase mask array and the color filter, wherein the measured intensity values associated with the broadband source enable a determination of a surface roughness, and the measured intensity values associated with the at least two laser sources enable a determination of a surface topography.

27. An optical interferometer for measuring surface characteristics of an object, comprising:
a test arm and a reference arm arranged to receive light from at least three light sources that include:
at least two laser sources configured to operate at a first and a second center wavelength, respectively, and
a broadband source configured to operate at a range of wavelengths outside of the operating range of the at least two lasers, wherein light from each of the at least three light sources is allowed to propagate through at least a section of the test arm, reflect from the object and reach an image plane, and light from each of the at least three light sources is allowed to propagate through at least a section of the reference arm, reflect from a reference optical component and reach the image plane;
a phase mask array and a color filter arranged, respectively, to impart at least three different phase delays and provide spectral filtering corresponding to emitted radiation from the at least two laser sources and the broadband source; and
a pixelated sensor device to simultaneously measure intensity values associated with a plurality of interferograms formed due to interference of light from the at least two laser sources and due to interference of light from the broadband source after propagation through the phase mask array and the color filter, wherein the measured intensity values associated with the broadband source enable a determination of a surface roughness, and the measured intensity values associated with the at least two laser sources enable a determination of a surface topography.

* * * * *